United States Patent
Ida et al.

(10) Patent No.: US 7,399,268 B2
(45) Date of Patent: Jul. 15, 2008

(54) METHOD FOR TREATMENT OF ARSENIC-CONTAMINATED SOIL

(75) Inventors: Toru Ida, Kobe (JP); Hiroshi Murakami, Kobe (JP); Yutaka Inada, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 0 days.

(21) Appl. No.: 11/291,822

(22) Filed: Dec. 2, 2005

(65) Prior Publication Data

US 2008/0139867 A1   Jun. 12, 2008

(30) Foreign Application Priority Data

Dec. 16, 2004 (JP) .............................. 2004-364404

(51) Int. Cl.
   *B09C 1/06* (2006.01)
(52) U.S. Cl. ..................... 588/256; 588/412; 588/320
(58) Field of Classification Search ................ 588/412, 588/256, 257, 320
   See application file for complete search history.

(56) References Cited

U.S. PATENT DOCUMENTS

| | | | |
|---|---|---|---|
| 4,782,625 A * | 11/1988 | Gerken et al. .......... | 405/128.85 |
| 4,821,653 A | 4/1989 | Jones | |
| 5,200,033 A * | 4/1993 | Weitzman ................. | 159/47.1 |
| 5,387,738 A | 2/1995 | Beckham et al. | |
| 2002/0022756 A1 | 2/2002 | Chowdhury et al. | |
| 2004/0112842 A1* | 6/2004 | Depelsenaire et al. ....... | 210/749 |

FOREIGN PATENT DOCUMENTS

| | | |
|---|---|---|
| FR | 2815338 A1 * | 4/2002 |
| JP | 2002-177941 | 12/2000 |
| JP | 2003-290759 | 4/2002 |
| JP | 2004-050029 | 7/2002 |
| RU | 2 198 857 C1 | 7/2001 |
| WO | WO 90/06820 | 12/1989 |

OTHER PUBLICATIONS

European Search Report dated Apr. 13, 2006.
Russian Office Action dated Feb. 14, 2007 with English translation.

* cited by examiner

*Primary Examiner*—John Kreck
(74) *Attorney, Agent, or Firm*—Reed Smith LLP; Stanley P. Fisher, Esq.; Juan Carlos A. Marquez, Esq.

(57) ABSTRACT

Disclosed herein is a method for treatment of arsenic-contaminated soil, said method being capable of insolubilizing arsenic compounds (in organic form or tri- or pentavalent inorganic form), thereby reducing their leaching level below the environmental standard value for soil. The method consists of heating arsenic-contaminated soil at 200 to 700° C. and mixing the heated soil with a calcium compound and water. The method also consists of mixing arsenic-contaminated soil with a calcium compound, heating the mixed soil at 200 to 700° C., and mixing the heated soil with water.

10 Claims, 1 Drawing Sheet

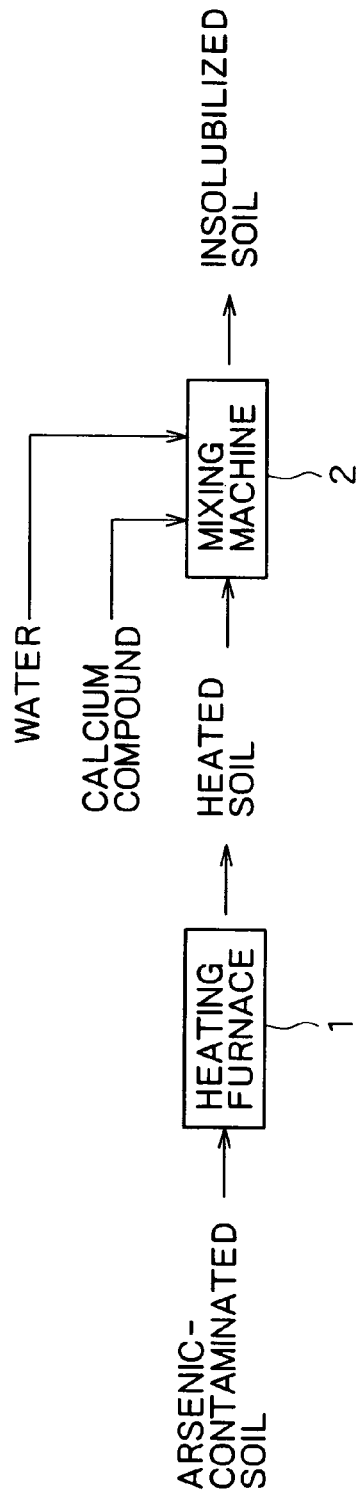
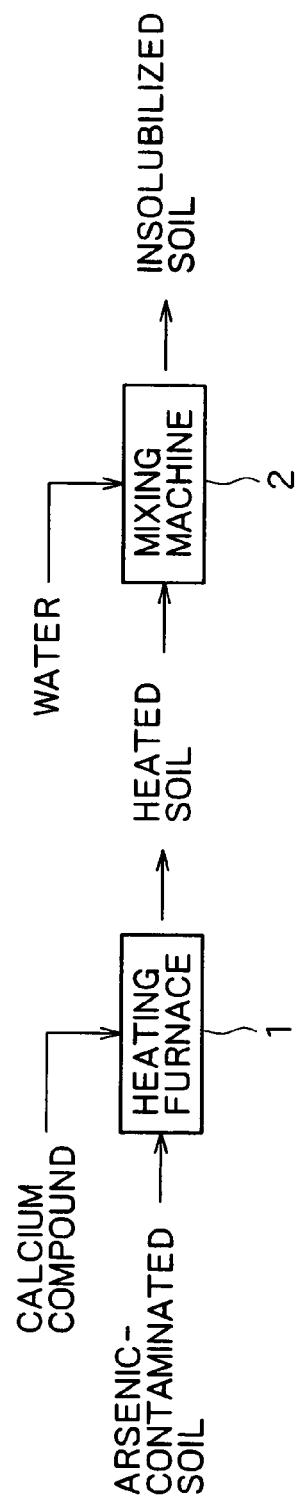

METHOD FOR TREATMENT OF ARSENIC-CONTAMINATED SOIL

BACKGROUND OF THE INVENTION

1. Field of the Invention

The present invention relates to a method for treatment of arsenic-contaminated soil, said method being designed to insolubilize arsenic in soil, thereby reducing the amount of leachable arsenic below the level specified by the environmental standard value for soil.

2. Description of the Related Art

Factories and establishments handling chemicals and pesticides often cause soil contamination with heavy metals discarded or leaking out of equipment and apparatus. One conventional way to address this problem was by removal of contaminants from soil by heating or washing, or by insolubilization of contaminants with chemicals added to soil. Treatment of soil contaminated with organoarsenic compounds originating from chemical weapons involves heating of contaminated soil in a kiln or the like for decomposition of contaminants. However, there has been no effective way to make arsenic compounds harmless because they assume various forms, such as trivalent or pentavalent inorganic or organic arsenic compounds which vary in characteristic properties.

Conventional technologies involving washing are disclosed in the following literature.

I. A. Legiec, L. P. Grifin, P. D. Walling, Jr., T. C. Breske, M. S. Angelo, R. S. Isaacson, M. B. Lanza, "DuPont Soil Washing Technology Program and Treatment of Arsenic Contaminated Soils", Environmental Progress, 16(1), 29-34 (1997).

This literature is concerned with washing with a cleaning agent, which is a strong alkaline aqueous solution of sodium hydroxide.

V. Hornburg, B. Luer, "Comparison between Total- and Aqua Regia Extractable Contents of Elements in Natural Soils and Sediments", J. Plant Nitr. Soil Sci. 162, 131-137 (1999).

This literature is concerned with washing with a strong acidic and strong oxidizing acid.

These conventional technologies involving strong alkaline or acidic chemicals suffer the disadvantage of requiring post-treatment to neutralize washed soils. Another disadvantage is difficulties with disposal of waste liquids and necessity for careful handling and safe storage of chemicals.

A method for decontamination by evaporation with heating is disclosed in Japanese Patent Laid-open No. 2004-50029. This method consists of mixing arsenic-contaminated soil with a silicone oil and heating the mixture at 600° C. or above, preferably 700-1000° C., in an inert gas atmosphere, so that heating decomposes the silicone oil to give silicon (Si). The thus released silicon reduces heavy metal compounds in contaminated soil, thereby forming heavy metals (in the form of simple substance or oxide), and the resulting heavy metals are evaporated and removed by heating. This method suffers the disadvantage of requiring a heating furnace that runs while keeping its inside free of oxygen. Such a heating furnace costs too much for treatment of contaminated soil in large quantities.

There is another conventional technology based on a combination of heating and washing, as disclosed in Japanese Patent Laid-open No. 2002-177941. It is designed to effectively remove arsenic (regardless of its form) from contaminated soil. The object is achieved by heating arsenic-contaminated soil and subsequent washing or by washing arsenic-contaminated soil and subsequent heating. This technology relies on the fact that trivalent arsenic compounds are volatile (at 465° C. for $As_2O_3$) but hardly soluble in water and hence easy to remove by heating, and pentavalent arsenic compounds are soluble in water (with a solubility of 414 g/L at 30° C. for $As_2O_5$) but hardly volatile and hence easy to remove by washing.

Unfortunately, trivalent and pentavalent arsenic compounds greatly vary in properties (volatility and water solubility) from elemental arsenic when they are contained in or adsorbed by soil. Moreover, it is difficult to predict the form of arsenic in arsenic-contaminated soil by analysis. Therefore, it is difficult to determine what to do first—heating for trivalent arsenic compounds or washing for pentavalent arsenic compounds.

The foregoing will be understood from Table 1 below which shows how arsenic is removed in different ratios when arsenic-contaminated soil is washed with water (ten times the weight of soil) with or without previous heating. It is noted from Table 1 that washing without previous heating removes only 6 to 15% of arsenic from contaminated soil. On the other hand, heating arsenic-contaminated soil at 550° C. for 20 minutes in air is not so effective as to reduce the content of arsenic. Moreover, heating and ensuing water washing are only slightly effective in removal of arsenic.

TABLE 1

| No. | Content of arsenic in arsenic-contaminated soil (mg/kg) | Ratio of removal of arsenic from contaminated soil by water washing | Content of arsenic in soil after heating (mg/kg) | Ratio of removal of arsenic by washing from heat-treated soil |
|---|---|---|---|---|
| 1 | 30 | 15% | 27 | 1% |
| 2 | 44 | 9% | 38 | 1% |
| 3 | 18 | 6% | 23 | 2% |
| 4 | 10 | 10% | 17 | 1% |
| 5 | 11 | 10% | 19 | 1% |

Soil usually contains divalent or multivalent metals, such as calcium. These metals form salts with pentavalent arsenic ions and resulting salts are only slightly soluble in soil water in soil. For example, calcium arsenate $Ca_3(AsO_4)_2$, which is a pentavalent arsenic compound, has such a small solubility product ($6.8 \times 10^{-19}$) that its removal by water washing is essentially impossible.

A method for insolubilization is disclosed in Japanese Patent Laid-open No. 2003-290759. This method consists of adding cement, hydroxyapatite, and poly(ferric sulfate) to contaminated soil containing heavy metals such as arsenic, thereby immobilizing heavy metals and preventing their leaching. Treatment by this method is economically disadvantageous because it employs expensive chemicals.

Organoarsenic compounds originating from chemical weapons are usually vaporized or decomposed by heating at 300 to 500° C. By contrast, when contained in soil, they react with metals (such as calcium, iron, and magnesium) in soil at the time of heating to convert into compounds which are hardly volatile and very difficult to remove by washing.

Table 2 below shows the test results obtained by heating a sample soil artificially contaminated with diphenyl-arsinic acid (DPAA: $C_{12}H_{11}AsO_2$), which is one of organo-arsenic compounds. It is noted that after heat treatment at 550° C. for 20 minutes, DPAA mostly (more than 99.93%) disappears but largely changes into inorganic arsenic compounds in soil. Thus heat treatment removes only 30 to 34% of arsenic.

TABLE 2

| No. | Amount of contaminant added | Amount of remaining contaminant |
|---|---|---|
| 1 | In the form of DPAA: 500 mg/kg<br>In the form of As: 143 mg/kg | In the form of DPAA: <0.1 mg/kg (<0.02%)<br>In the form of As: 100 mg/kg (69.9%) |
| 2 | In the form of DPAA: 1000 mg/kg<br>In the form of As: 2863 mg/kg | In the form of DPAA: 7 mg/kg (0.7%)<br>In the form of As: 1900 mg/kg (66.4%) |

Patent document 1: Japanese Patent Laid-open No. 2004-50029 (Paragraphs 0014 to 0015)

Patent document 2: Japanese Patent Laid-open No. 2002-177941 (Paragraphs 0010 to 0011)

Patent document 3: Japanese Patent Laid-open No. 2003-290759 (Paragraphs 0009 to 0016)

OBJECT AND SUMMARY OF THE INVENTION

It is an object of the present invention to provide a method for treatment of arsenic-contaminated soil, said method being capable of insolubilizing arsenic compounds (in organic form or tri- or pentavalent inorganic form), thereby reducing their leaching level below the environmental standard value for soil.

According to the present invention, the above-mentioned objective is achieved by any of the methods defined in the following.

The first aspect of the present invention is directed to a method for treatment of arsenic-contaminated soil which comprises heating arsenic-contaminated soil at 200 to 700° C. in the presence of air or oxygen and mixing the heated soil with a calcium compound and water.

The second aspect of the present invention is directed to a method for treatment of arsenic-contaminated soil which comprises mixing arsenic-contaminated soil with a calcium compound, heating the mixed soil at 200 to 700° C., and mixing the heated soil with water.

The third aspect of the present invention is designed to modify the method according to the first aspect in such a way that 100 parts by weight of the heated soil is mixed with 3-20 (preferably 5-10) parts by weight of calcium compound and 10-70 (preferably 20-40) parts by weight of water.

The fourth aspect of the present invention is designed to modify the method according to the second aspect in such a way that 100 parts by weight of arsenic-contaminated soil is mixed with 3-20 (preferably 5-10) parts by weight of calcium compound and 100 parts by weight of the heated soil is mixed with 10-70 (preferably 20-40) parts by weight of water.

The fifth aspect of the present invention is designed to modify the method according to any of the first to fourth aspects in such a way that the calcium compound is one or more species selected from quick lime, slaked lime, cement, and blast furnace cement.

According to the present invention, the method for treatment of arsenic-contaminated soil is characterized by a combination of heating treatment and insolubilizing treatment. The combined treatment forms hardly soluble arsenic compounds (composed of arsenic and calcium) from either organoarsenic compounds or inorganic tri- or pentavalent arsenic compounds in arsenic-contaminated soil, thereby insolubilizing arsenic in contaminated soil and reducing the level of leachable arsenic below the environmental standard value for soil.

BRIEF DESCRIPTION OF THE DRAWINGS

FIG. 1 is a flow diagram showing the method for treatment of arsenic-contaminated soil according to the first embodiment of the present invention.

FIG. 2 is a flow diagram showing the method for treatment of arsenic-contaminated soil according to the second embodiment of the present invention.

DESCRIPTION OF THE PREFERRED EMBODIMENTS

According to the first embodiment of the present invention, the method for treatment of arsenic-contaminated soil consists of heating arsenic-contaminated soil at 200 to 700° C. in the presence of air or oxygen and mixing the heated soil with a calcium compound and water. The heating of contaminated soil in the presence of air or oxygen oxidizes trivalent arsenic compounds in contaminated soil into pentavalent arsenic compounds and also vaporizes part of organoarsenic compounds into inorganic arsenic compounds so that the vaporized arsenic compounds are oxidized into pentavalent inorganic arsenic compounds by air or oxygen in the heating atmospheric gas. In other words, this heat treatment converts trivalent inorganic arsenic compounds and organoarsenic compounds into pentavalent inorganic arsenic compounds which are readily soluble in water.

In the next step, the heated soil is mixed with a calcium compound (such as slaked lime) and water. The added calcium compound reacts with the pentavalent inorganic arsenic compound to give an arsenic-calcium compound which is hardly soluble in water. Since the amount of the calcium compound added is more than the stoichiometric amount of arsenic in the contaminated soil, the calcium compound reacts with water (added together with the calcium compound) and silica in the contaminated soil, thereby forming water-impervious calcium silicate layer on the surface of soil particles.

According to the second embodiment of the present invention, the method for treatment of arsenic-contaminated soil consists of mixing arsenic-contaminated soil with a calcium compound, heating the mixed soil at 200 to 700° C. in the presence of air or oxygen, and mixing the heated soil with water. In the first step of this method, contaminated soil is mixed with a calcium compound and the mixed soil is heated, so that the calcium compound reacts with pentavalent arsenic compounds formed in the course of heating. In the next step, the heated soil is mixed with water which promotes the reaction between the calcium compound and the pentavalent arsenic compound, thereby forming arsenic-calcium compounds which are hardly soluble in water. Since the amount of the calcium compound added is more than the stoichiometric amount of arsenic in the contaminated soil, the calcium compound reacts with silica in the contaminated soil, thereby forming water-impervious calcium silicate layer on the surface of soil particles.

According to the present invention, the method for treatment of arsenic-contaminated soil is intended to convert arsenic in contaminated soil into hardly soluble arsenic-calcium compounds, no matter whether arsenic in contaminated soil is in the form of organoarsenic compound or trivalent or pentavalent inorganic arsenic compound, thereby insolubilizing arsenic in contaminated soil. In addition, treatment by this method forms a water-impervious layer on the surface of soil particles, thereby reducing the level of leachable arsenic in soil water below the environmental standard value for soil.

According to the present invention, the method for treatment of arsenic-contaminated soil requires that the heating temperature should be 200 to 700° C. in the presence of air or oxygen. Heating at a lower temperature than that does not sufficiently oxidize trivalent inorganic arsenic compounds, nor does it vaporize, decompose, and oxidize organoarsenic compounds. Heating at a higher temperature than that requires the heating furnace (or heating apparatus) to have high refractory performance, which increases the cost of equipment.

The calcium compound to be added is not specifically restricted so long as it supplies calcium ions capable of reacting with arsenic and also capable of reacting with water and silica in contaminated soil, thereby forming a water-impervious calcium silicate layer. Such a calcium compound includes, for example, one or more species selected from quick lime, slaked lime, cement, and blast furnace cement.

According to the present invention, the method for treatment of arsenic-contaminated soil is intended to cause a calcium compound to react with pentavalent inorganic arsenic compounds as well as silica in contaminated soil. Such reactions need more calcium compound than the stoichiometric amount of arsenic in contaminated soil; however, a large excess of calcium compound wastes to increase the cost of treatment. The amount of the calcium compound should be 3-20 parts by weight, preferably 5-10 parts by weight, for 100 parts by weight of contaminated soil with heating (in the first embodiment) or contaminated soil without heating (in the second embodiment).

As mentioned above, the amount of water to be added should be large enough to bring about the reaction to form hardly soluble arsenic-calcium compounds and the reaction to form a water-impervious calcium silicate layer from the calcium compound added and silica in contaminated soil. The amount of water should be 10-70 parts by weight, preferably 20-40 parts by weight, for 100 parts by weight of contaminated soil with heating (in the first embodiment) or contaminated soil without heating (in the second embodiment). The amount of water varies depending on soil type. For example, it is 10-40 parts by weight for sandy soil (depending on grain size and property) and 20-70 parts by weight for clayey or silty soil.

FIG. 1 is a flow diagram showing the method for treatment of arsenic-contaminated soil according to the first embodiment of present invention. FIG. 2 is a flow diagram showing the method for treatment of arsenic-contaminated soil according to the second embodiment of present invention.

In FIGS. 1 and 2, there is shown a heating furnace 1. It is not specifically restricted so long as it is capable of heating arsenic-contaminated soil at 200-700° C. in an atmosphere of air or oxygen. It may be of kiln type for continuous treatment. It may employ any heating source, such as high-temperature combustion gas of heavy oil or gaseous fuel, for direct heating. It may be of dual cylinder structure, with hot air passing through the outer cylinder for indirect heating.

The duration of heat treatment in the heating furnace 1 should be properly adjusted according to the amount of arsenic and water in contaminated soil. For the treatment of arsenic-contaminated Kanto loam in Examples 1 to 4 (mentioned later), an adequate heating time was 20 minutes because arsenic existed in surface soil with a high water content.

In FIGS. 1 and 2, there is shown a mixing machine 2. It is not specifically restricted in type so long as it is capable of uniformly mixing heated soil with water and calcium compound (as in FIG. 1) or it is capable of uniformly mixing a heated mixture of contaminated soil and calcium compound with water (as in FIG. 2). It may be a horizontal paddle mixer, vertical mixer, or stabilizer for outdoor use.

The addition of water to arsenic-contaminated soil after heating may be accomplished during mixing or prior to mixing (if there exists sufficient water at the time of mixing). Also, the addition of calcium compound may be accomplished during mixing or prior to mixing (if there exists sufficient calcium compound at the time of mixing). Moreover, the calcium compound may be added to arsenic-contaminated soil during its heating (as shown in FIG. 2) or before its feeding to the heating furnace 1. In the latter case, a heating furnace of kiln type is recommended for its good mixing effect.

Example 1

The following four experiments Nos. 1 to 4 were carried out in Comparative Example. A sample of arsenic-contaminated soil (Kanto loam) containing 0.097 mg/L of leachable arsenic was obtained. The sample (100 pbw) was thoroughly mixed with water and slaked lime or quick lime in different quantities as follows.

40 pbw of water and 5 pbw of slaked lime in No. 1.

40 pbw of water and 7 pbw of slaked lime in No. 2.

40 pbw of water and 12 pbw of slaked lime in No. 3.

40 pbw of water and 5 pbw of quick lime in No. 4.

The mixtures were allowed to stand at room temperature. After 1 day, 7 days, and 28 days of ageing, the mixtures were tested for arsenic leaching according to the method specified in Environmental Quality Standards for Soil Pollution (Notification No. 46) of the Japanese Ministry of Environment Agency. The results of the test are shown in Table 3.

TABLE 3

| Experiment No. | Amount of calcium compound added | Amount of water added | Heat treatment | Amount of arsenic which leached from treated soil (mg/L) | | |
|---|---|---|---|---|---|---|
| | | | | After 1-day ageing | After 7-day ageing | After 28-day ageing |
| 1 | Slaked lime 5 pbw | 40 pbw | None | 0.216 | 0.190 | 0.135 |
| 2 | Slaked lime 7 pbw | 40 pbw | None | 0.190 | 0.180 | 0.080 |
| 3 | Slaked lime 12 pbw | 40 pbw | None | 0.180 | 0.120 | 0.008 |
| 4 | Quick lime 5 pbw | 40 pbw | None | 0.182 | 0.110 | 0.007 |

The following four experiments Nos. 1 to 4 were conducted in Example 1. A sample of the same arsenic-contaminated soil (Kanto loam) as in Comparative Example was obtained. The sample was heated at 550° C. for 20 minutes in a heating furnace in the atmosphere of air. The heated sample (100 pbw) was thoroughly mixed with water and slaked lime or quick lime in different quantities as follows.

40 pbw of water and 5 pbw of slaked lime in No. 5.

40 pbw of water and 7 pbw of slaked lime in No. 6.

40 pbw of water and 12 pbw of slaked lime in No. 7.

40 pbw of water and 5 pbw of quick lime in No. 8.

The mixtures were allowed to stand at room temperature. After 1 day, 7 days, and 28 days of ageing, the mixtures were tested for arsenic leaching according to the method specified in Notification No. 46 of the Japanese Environment Agency. The results of the test are shown in Table 4.

TABLE 4

| Experiment No. | Heat treatment | Amount of calcium compound added | Amount of water added | Amount of arsenic which leached from treated soil (mg/L) | | |
|---|---|---|---|---|---|---|
| | | | | After 1-day ageing | After 7-day ageing | After 28-day ageing |
| 5 | 550° C., 20 min | Slaked lime, 5 pbw | 40 pbw | <0.002 | <0.002 | <0.002 |
| 6 | 550° C., 20 min | Slaked lime, 7 pbw | 40 pbw | <0.002 | <0.002 | <0.002 |
| 7 | 550° C., 20 min | Slaked lime, 12 pbw | 40 pbw | <0.002 | <0.002 | <0.002 |
| 8 | 550° C., 20 min | Quick lime, 5 pbw | 40 pbw | <0.002 | <0.002 | <0.002 |

It is noted from Table 4 that, as experiments Nos. 5 to 8 in Example 1 show, the combination of heat treatment and insolubilizing treatment reduces the amount of leachable arsenic below 0.002 mg/L, which is lower than the environmental standard value for soil (0.01 mg/L). On the other hand, it is noted from Table 3 that, as experiments No. 1 to 4 in Comparative Example show, insolubilizing treatment without heat treatment does not reduce the amount of leachable arsenic below the environmental standard value for soil. Incidentally, the amount of leachable arsenic decreases below the environmental standard value for soil after ageing for 28 days in experiments Nos. 3 and 4. However, such a long period of ageing is not practical.

Example 2

The following two experiments Nos. 9 and 10 were carried out in Example 2. A sample of arsenic-contaminated soil (Kanto loam) containing 0.109 mg/L of leachable arsenic was obtained from the same location as in Comparative Example. This arsenic content is about four times as high as that in Example 1. The sample was heated at 550° C. for 20 minutes in a heating furnace in the atmosphere of air. The heated sample (100 pbw) was thoroughly mixed with water and quick lime in different quantities as follows.

40 pbw of water and 3 pbw of quick lime in No. 9.

40 pbw of water and 5 pbw of quick lime in No. 10.

The mixtures were allowed to stand at room temperature. After 1 day, 7 days, and 28 days of ageing, the mixtures were tested for arsenic leaching according to the method specified in Notification No. 46 of the Japanese Environment Agency. The results of the test are shown in Table 5.

TABLE 5

| Experiment No. | Heat treatment | Amount of calcium compound added | Amount of water added | Amount of arsenic which leached from treated soil (mg/L) | | |
|---|---|---|---|---|---|---|
| | | | | After 1-day ageing | After 7-day ageing | After 28-day ageing |
| 9 | 550° C., 20 min | Quick lime, 3 pbw | 40 pbw | <0.002 | <0.002 | <0.002 |
| 10 | 550° C., 20 min | Quick lime, 5 pbw | 40 pbw | <0.002 | <0.002 | <0.002 |

It is noted from Table 5 that, as experiments Nos. 9 and 10 in Example 2 show, the combination of heat treatment and insolubilizing treatment reduces the amount of leachable arsenic below 0.002 mg/L, which is lower than the environmental standard value for soil (0.01 mg/L).

Example 3

The following three experiments Nos. 11 to 13 were carried out in Example 3. A sample of arsenic-contaminated soil (Kanto loam) containing about 3 to 4 times as much leachable arsenic as that in Example 2 was obtained from the same location as in Comparative Example. The sample (100 pbw) was mixed with quick lime (3 pbw in No. 11, 5 pbw in No. 12, and 10 pbw in No. 13). The mixture was heated at 550° C. for 20 minutes in a heating furnace in the atmosphere of air. The heated mixture (100 pbw) was thoroughly mixed with water (40 pbw). The mixtures were allowed to stand at room temperature. After 1 day, 7 days, and 28 days of ageing, the mixtures were tested for arsenic leaching according to the method specified in Notification No. 46 of the Japanese Environment Agency. The results of the test are shown in Table 6.

TABLE 6

| Experiment No. | Contaminated soil Arsenic content (mg/kg) | Contaminated soil Leached arsenic (mg/L) | Amount of calcium compound added | Heat treatment | Arsenic content in heated soil (mg/kg) | Amount of water added | Leachable arsenic in treated soil (mg/L) |
|---|---|---|---|---|---|---|---|
| 11 | 19 | 0.38 | Quick lime, 3 pbw | 550° C., 20 min | 35 | 40 pbw | <0.002 |
| 12 | 25 | 0.47 | Quick lime, 5 pbw | 550° C., 20 min | 36 | 40 pbw | <0.002 |
| 13 | 67 | 0.47 | Quick lime, 10 pbw | 550° C., 20 min | 43 | 40 pbw | <0.002 |

It is noted from Table 6 that, as experiments Nos. 11 to 13 in Example 3 show, the combination of heat treatment and insolubilizing treatment reduces the amount of leachable arsenic below 0.002 mg/L, which is lower than the environmental standard value for soil (0.01 mg/L).

Example 4

The following three experiments Nos. 14 to 17 were carried out in Example 4. A sample of arsenic-contaminated soil (Kanto loam) containing leachable arsenic of 0.180 mg/L was obtained from the same location as in Comparative Example. In Experiment No. 14 (for comparison), the sample was merely heated at 550° C. for 20 minutes. In Experiment No. 15 (for comparison), the sample was heated and then mixed with water. In Experiment No. 16 (for comparison), the sample was mixed with slaked lime and then heated. In Experiment No. 17 (according to the invention), the sample was mixed with slaked lime, then heated, and finally mixed with water. The samples of the treated soils were tested for arsenic leaching according to the method specified in Notification No. 46 of the Japanese Environment Agency. The results of the test are shown in Table 7.

TABLE 7

| Experiment No. | Amount of slaked lime added (pbw) | Heat treatment | Amount of water added (pbw) | Amount of leachable arsenic (mg/L) |
|---|---|---|---|---|
| 14 | 0 | 550° C., 20 min | 0 | 0.013 |
| 15 | 0 | 550° C., 20 min | 40 | 0.021 |
| 16 | 3 | 550° C., 20 min | 0 | 0.021 |
| 17 | 3 | 550° C., 20 min | 40 | 0.008 |

It is noted from Table 7 that experiments Nos. 14 to 16 (for comparison) did not reduce the amount of leachable arsenic below the environmental standard value for soil. By contrast, experiment No. 17, which employed the combination of heat treatment and insolubilizing treatment, reduced the amount of leachable arsenic to 0.008 mg/L, which meets the environmental standard value for soil (lower than 0.01 mg/L).

The foregoing invention has been described in terms of preferred embodiments. However, those skilled, in the art will recognize that many variations of such embodiments exist. Such variations are intended to be within the scope of the present invention and the appended claims.

What is claimed is:

1. A method for treatment of arsenic-contaminated soil which comprises heating arsenic-contaminated soil at 200 to 700° C. in the presence of air or oxygen thereby converting trivalent inorganic arsenic compounds and organoarsenic compounds in the arsenic-contaminated soil into pentavalent inorganic arsenic compounds which are readily soluble in water; and mixing the heated soil with a calcium compound and water into a mixture thereby converting said pentavalent inorganic arsenic compounds into calcium arsenate compounds,
   wherein 100 parts by weight of the heated soil is mixed with 3 to 20 parts by weight of the calcium compound and 10 to 70 parts by weight of the water.

2. A method for treatment of arsenic-contaminated soil which comprises mixing arsenic-contaminated soil with a calcium compound; heating the mixed soil at 200 to 700° C. in the presence of air or oxygen thereby converting trivalent inorganic arsenic compounds and organoarsenic compounds in the arsenic-contaminated soil into pentavalent inorganic arsenic compounds which are readily soluble in water; and mixing the heated soil with water into a mixture thereby converting said pentavalent inorganic arsenic compounds into calcium arsenate compounds,
   wherein 100 parts by weight of arsenic-contaminated soil is mixed with 3 to 20 parts by weight of the calcium compound, and 100 parts by weight of the heated soil is mixed with 10 to 70 parts by weight of the water.

3. The method for treatment of arsenic-contaminated soil as defined in claim 1, wherein 100 parts by weight of the heated soil is mixed with 5 to 10 parts by weight of the calcium compound and 20-40 parts by weight of the water.

4. The method for treatment of arsenic-contaminated soil as defined in claim 2, wherein 100 parts by weight of arsenic-contaminated soil is mixed with 5 to 10 parts by weight of the calcium compound, and 100 parts by weight of the heated soil is mixed with 20-40 parts by weight of the water.

5. The method for treatment of arsenic-contaminated soil as defined in claim 2, wherein the calcium compound is one or more species selected from quick lime, slaked lime, cement, and blast furnace cement.

6. A method for treatment of arsenic-contaminated soil which consists of heating arsenic-contaminated soil at 200 to 700° C. in the presence of air or oxygen thereby converting trivalent inorganic arsenic compounds and organoarsenic compounds in the arsenic-contaminated soil into pentavalent inorganic arsenic compounds which are readily soluble in water; and mixing the heated soil with a calcium compound and water into a mixture thereby converting said pentavalent inorganic arsenic compounds into calcium arsenate compounds, wherein 100 parts by weight of the heated soil is mixed with 3 to 20 parts by weight of the calcium compound and 10 to 70 parts by weight of the water.

7. A method for treatment of arsenic-contaminated soil which consists of mixing arsenic-contaminated soil with a calcium compound; heating the mixed soil at 200 to 700° C. in the presence of air or oxygen thereby converting trivalent inorganic arsenic compounds and organoarsenic compounds in the arsenic-contaminated soil into pentavalent inorganic arsenic compounds which are readily soluble in water; and mixing the heated soil with water into a mixture thereby converting said pentavalent inorganic arsenic compounds into calcium arsenate compounds, wherein 100 parts by weight of arsenic-contaminated soil is mixed with 3 to 20 parts by weight of the calcium compound, and 100 parts by weight of the heated soil is mixed with 10 to 70 parts by weight of the water.

8. The method for treatment of arsenic-contaminated soil as defined in claim 6, wherein 100 parts by weight of the heated soil is mixed with 5 to 10 parts by weight of the calcium compound and 20-40 parts by weight of the water.

9. The method for treatment of arsenic-contaminated soil as defined in claim 7, wherein 100 parts by weight of arsenic-contaminated soil is mixed with 5 to 10 parts by weight of the calcium compound, and 100 parts by weight of the heated soil is mixed with 20-40 parts by weight of the water.

10. The method for treatment of arsenic-contaminated soil as defined in claim 7, wherein the calcium compound is one or more species selected from quick lime, slaked lime, cement, and blast furnace cement.

* * * * *